(12) United States Patent
Zhang et al.

(10) Patent No.: US 10,013,239 B2
(45) Date of Patent: Jul. 3, 2018

(54) METADATA DRIVEN REAL-TIME ANALYTICS FRAMEWORK

(71) Applicant: Microsoft Technology Licensing, LLC, Redmond, WA (US)

(72) Inventors: Wenjin Zhang, Shanghai (CN); Xiaoning Ding, Shanghai (CN); Wee Hyong Tok, Shanghai (CN); Xiaochen Wu, Shanghai (CN); Rujin Cao, Shanghai (CN); Bekim Demiroski, Shanghai (CN); Xiaoyan Zhao, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 14/975,392

(22) Filed: Dec. 18, 2015

(65) Prior Publication Data

US 2016/0103657 A1    Apr. 14, 2016

Related U.S. Application Data

(62) Division of application No. 13/713,369, filed on Dec. 13, 2012, now Pat. No. 9,251,324.

(51) Int. Cl.
*G06F 21/00* (2013.01)
*G06F 8/20* (2018.01)
(Continued)

(52) U.S. Cl.
CPC .............. *G06F 8/20* (2013.01); *G06F 8/31* (2013.01); *G06F 8/38* (2013.01); *G06F 8/61* (2013.01);
(Continued)

(58) Field of Classification Search
USPC .............................................. 726/1
See application file for complete search history.

(56) References Cited

U.S. PATENT DOCUMENTS 6,272,213 B1    8/2001    Nightingale
7,058,657 B1    6/2006    Berno
(Continued)

FOREIGN PATENT DOCUMENTS

CN    101326515 A    12/2008

OTHER PUBLICATIONS

International Search Report and Written Opinion received for PCT Patent Application No. PCT/US2013/075158, dated Jul. 17, 2014, 9 pages.
(Continued)

*Primary Examiner* — Jason Lee
(74) *Attorney, Agent, or Firm* — Fiala & Weaver P.L.L.C.

(57) ABSTRACT

Methods, systems, and computer program products are provided for developing application definition packages, and deploying the application definition packages at cloud services to produce real-time data analytics applications. In one implementation, a selection is received of an application definition package that defines a real-time data analytics application. The application definition package indicates an application name and includes at least one payload definition, reference data definition, and query definition. A domain name is provided for the real-time data analytics application, and a cloud service is generated that is associated with the domain name. The application definition package is applied to an application template to generate a finalized real-time data analytics package. The finalized real-time data analytics package is instantiated in the cloud service to create a network-accessible instance of the real-time data analytics application.

17 Claims, 9 Drawing Sheets

(51) Int. Cl.
  *G06F 21/31* (2013.01)
  *G06F 8/30* (2018.01)
  *G06F 8/38* (2018.01)
  *G06F 8/61* (2018.01)
  *G06F 21/44* (2013.01)

(52) U.S. Cl.
  CPC .............. *G06F 21/31* (2013.01); *G06F 21/44* (2013.01); *G06F 2221/2141* (2013.01)

(56) References Cited

U.S. PATENT DOCUMENTS

| | | | |
|---|---|---|---|
| 7,596,620 | B1 | 9/2009 | Colton et al. |
| 7,657,887 | B2* | 2/2010 | Kothandaraman ..... H04L 67/06 717/170 |
| 2004/0006550 | A1 | 1/2004 | Upton |
| 2004/0015842 | A1 | 1/2004 | Nanivadekar et al. |
| 2006/0136417 | A1 | 6/2006 | Avinash et al. |
| 2007/0011304 | A1 | 1/2007 | Error |
| 2008/0159633 | A1 | 7/2008 | van Eikeren et al. |
| 2008/0163043 | A1 | 7/2008 | van Eikeren |
| 2009/0240695 | A1 | 9/2009 | Angell et al. |
| 2009/0288064 | A1 | 11/2009 | Yen et al. |
| 2010/0083287 | A1 | 4/2010 | Maximilien et al. |
| 2010/0095367 | A1* | 4/2010 | Narayanaswamy ........................ H04L 63/0245 726/12 |
| 2011/0029963 | A1 | 2/2011 | Smith et al. |
| 2011/0214157 | A1* | 9/2011 | Korsunsky .............. G06F 21/55 726/1 |
| 2012/0022916 | A1 | 1/2012 | Todd et al. |
| 2012/0102103 | A1* | 4/2012 | Jacobson .............. G06F 9/5072 709/204 |
| 2012/0185439 | A1* | 7/2012 | Chen ................. G06F 17/30516 707/661 |
| 2013/0151453 | A1 | 6/2013 | Bhanot et al. |
| 2013/0282188 | A1 | 10/2013 | Donde |
| 2014/0173683 | A1 | 6/2014 | Zhang et al. |

OTHER PUBLICATIONS

Evelson, Boris, "Next Gen of Metadata Driven BI Apps", Retrieved at <<http://www.information-management.com/blogs/metadata_business_intelligence_bi-10017253-1.html>>, Retrieved Date: Jun. 1, 2012, pp. 13.

Friedman, et al., "Magic Quadrant for Data Integration Tools", Retrieved at <<http://www.virtualtechtour.com/assets/GARTNER_DI_MQ_2010_magic_quadrant_for_data_inte_207435.pdf>>, Nov. 19, 2010, pp. 35.

Perry, et al., "Force.com Cloud Plat form Drives Huge Time to Market and Cost Savings", Retrieved at <<http://thecloud.appirio.com/rs/appirio/images/IDC_Force.com_ROI_Study.pdf, Sep. 2009, pp. 16.

Bolohan, et al., "SAS Enterprise Data Integration Server—A Complete Solution Designed to Meet the Full Spectrum of Enterprise Data Integration Needs", Retrieved at <<http://www.dbjournal.ro/archive/7/7_5.pdf>>, Database Systems Journal vol. III, Nov. 21, 2009, pp. 8.

Wu, et al., "A Service-oriented Architecture for Business Intelligence", Retrieved at <<http://ieeexplore.ieee.org/stamp/stamp.jsp?tp=&arnumber=4273437>>, IEEE International Conference on Service-Oriented Computing and Applications, Jun. 19, 2007, pp. 279-285.

Rimal, et al., "A Framework of Scientific Workflow Management Systems for Multi-Tenant Cloud Orchestration Environment", Retrieved at <<http://ieeexplore.ieee.org/stamp/stamp.jsp?tp=&arnumber=5541997>>, IEEE International Workshop on Enabling Technologies: Infrastructures for Collaborative Enterprises (WETICE), Jun. 28, 2010, pp. 88-93.

Lansing, et al.,"Designing the Cloud-based DOE Systems Biology Knowledgebase", Retrieved at <<http://ieeexplore.ieee.org/stamp/stamp.jsp?tp=&arnumber=6008894>>, IEEE International Symposium on Parallel and Distributed rocessing Workshops and Phd Forum (IPDPSW), May 16, 2011, pp. 1062-1071.

"Oracle SaaS Platform: Building On-Demand Applications", Retrieved at <<http://www.oracle.com/us/technologies/cloud/026989.pdf>>, Sep. 2008, 21 pages.

"First Office Action and Search Report Issued in Chinese Patent Application No. 201380065209.X", dated Jan. 26, 2017, 13 Pages.

"Office Action Issued in European Patent Application No. 13818085.6", dated Mar. 27, 2017, 4 Pages.

"Supplementary Search Report Issued in European Patent Application No. 13818085.6", dated Jul. 26, 2016, 10 pages.

"Office Action Issued in Chinese Patent Application No. 201380065209.X", dated Oct. 9, 2017, 7 Pages.

* cited by examiner

METADATA DRIVEN REAL-TIME ANALYTICS FRAMEWORK

CROSS-REFERENCE TO RELATED APPLICATIONS

This application is a divisional of U.S. application Ser. No. 13/713,369, filed Dec. 13, 2012, entitled "Metadata Driven Real-Time Analytics Framework," now allowed, which is incorporated by reference in its entirety herein.

BACKGROUND

"Data analytics" refers to techniques for the analysis of data to draw conclusions about the data. Data analytics is used by many entities, including being used by businesses to make better business decisions, and being used by scientists to verify or disprove existing models or theories. Data analytics is different from data mining. In data mining, data miners sort through huge data sets to identify undiscovered patterns and establish hidden relationships. In contrast, data analytics is directed to deriving conclusions based on the data and the knowledge of the researcher configuring the data analytics. Data analytics may include the inspecting, cleaning, transforming, and modeling of data to highlight useful information, suggest conclusions, support decision making, and/or provide other beneficial results.

In some cases, data analytics may be performed on "real-time" data, which is data that is delivered for analysis as soon as it is collected or generated. A data analytics application that analyzes real-time data may be referred to as a real-time data analytics application. The development of an end-to-end real-time data analytics application is complicated and labor intensive. A developer of such a real-time data analytics application has to spend a significant amount of time programming the various components of the application, including having to program a data acquisition component, an analytics component, and a results dissemination component.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for developing an application definition package that contains components used to build a data analytics application. An instance of the data analytics application may be deployed at a network-based service (e.g., a cloud service) by un-packaging the application definition application into a generic framework that provides the data acquisition, data analytics, and results dissemination components. The deployed data analytics application may receive data, including real-time data, and may process the received data to generate output data. The output data may be received and displayed to a user accessing a user dashboard.

In one implementation, a deployable real-time data analytics application is configured. A user is enabled to provide a name for the real-time data analytics application, to provide at least one payload definition that defines real-time data to be received by the real-time data analytics application, to provide at least one reference data definition that defines reference data to be accessed by the real-time data analytics application, and to provide at least one query definition that defines at least one query configured to operate on the real-time data and the reference data to generate output data for the real-time analytics application. The user may be enabled to configure further components of the real-time data analytics application, including security, control flows, user interface dashboard assemblies, and further components. An application definition package is generated that indicates the application name and includes the payload definition(s), the reference data definition(s), and the query definition(s). The application definition package is configured to be applied to a service framework to enable an instance of the real-time data analytics application to be deployed and be network-accessible.

In a further implementation, a selection is received of an application definition package that defines a real-time data analytics application. The application definition package indicates an application name and includes at least one payload definition, at least one reference data definition, at least one query definition, and optionally further components. A domain name is provided for the real-time data analytics application, and a network-based service is generated that is associated with the domain name. The application definition package is applied to an application template to generate a finalized real-time data analytics package. The finalized real-time data analytics package is unpackaged to create an instance of the real-time data analytics application that is deployed to the network-based service.

In one implementation, a real-time data analytics service includes a data analytics application framework and a network-based service. The data analytics application framework is configurable to generate a real-time data analytics application. The data analytics application framework includes an event collection module, a reference data service, and a data analytics processing engine. The network-based service executes in at least one server and is configured to provide network access for the real-time data analytics application. The event collection module is configured to receive at least one payload definition that defines real-time data to be received by the event collection module. The reference data service is configured to receive at least one reference data definition that defines reference data to be provided by the reference data service. The data analytics processing engine is configured to receive at least a query definition that defines at least one query. The data analytics processing engine is configured to process the real-time data and the reference data according to the query/queries to generate output data for the real-time analytics application.

Computer program products containing computer readable storage media are also described herein that store computer code/instructions for developing a deployable real-time data analytics application in the form of a package, for deploying such a package to generate a real-time data analytics application, and for operating a deployed instance of a real-time data analytics application, as well as enabling additional embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
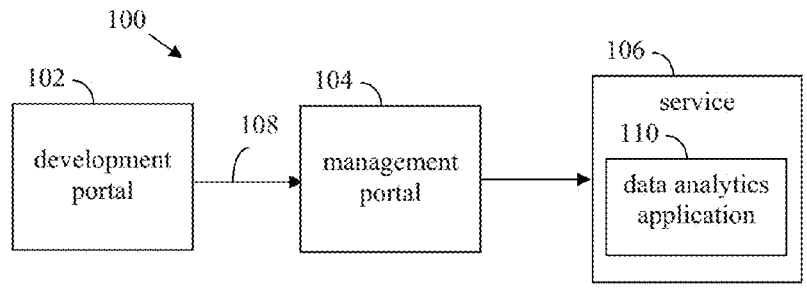
FIG. 1 shows a block diagram of a data analytics system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

"Data analytics" refers to techniques for the analysis of data to draw conclusions about the data, and is used by many entities to make improved business decisions, to verify or disprove existing models or theories, and for further reasons. Data analytics may include the inspecting, cleaning, transforming, and modeling of data to highlight useful information, suggest conclusions, support decision making, and/or provide other beneficial results. In some cases, data analytics may be performed on "real-time" data, which is data that is delivered for analysis as soon as it is collected or generated. Such real-time data may be received continually, and may be analyzed at any time to make conclusions about the applicable environment at the collection time.

A data analytics application that analyzes real-time data may be referred to as a real-time analytics application. A real-time data analytics application that is deployed to a network-based service (e.g., a cloud service) may be referred to as a real-time data analytics service. The development of an end-to-end real-time data analytics service is complicated and labor intensive. A developer of such a real-time data analytics service has to spend a significant amount of time programming the various components of the service, including having to program a data acquisition component, an analytics component, and a results dissemination component for the service.

According to embodiments, a data analytics framework or system is provided that enables data analytics applications to be developed in a more efficient manner. For instance, in an embodiment, a data analytics development portal may be used to develop a data analytics application in a deployable form, such as a package. A management portal may receive the package, and based on the package may deploy an instance of the data analytics application in the data analytics framework as a service. The data analytics framework provides an interface for data collection, an analytics engine for performing the data analytics, and an interface for outputting information to one or more clients. The framework is configured according to the package to operate as a data analytics service for the data analytics application.

For instance, in an embodiment, a meta-data driven real-time analytic framework is provided. The framework utilizes a deployment container for an end-to-end real-time analytics solution, and a real-time analytics service host. A developer may make use of a design tool used to model the end-to-end analytics solution. The analytics model includes various components configured by the developer such as ingress event acquisition endpoints, an ingress event payload definition, a result payload definition, reference data, a control-flow, and configurations. The analytics model may be encapsulated into a deployment container that is a single deployment file (e.g., an ".adpac" file), which can be provided to a network location (e.g., to the "cloud").

The real-time analytics service host may receive the analytics model in the deployment file, and may deploy the analytics model by physically instantiating the different components included in the deployment file. The host may automatically connect the different components together, and the user may configure and startup the resulting data analytics solution as a real-time data analytics service. The real-time analytic service host may be configured to monitor the health of the real-time data analytics service.

As such, according to embodiments, a developer can define the core components of a data analytics service, such as a structure of the input data, a structure of any reference data, and the analytics logic (e.g., in the form of a query) to be performed on the input data and reference data to generate output data, without having to additionally generate a data acquisition component, an analytics component, and a results dissemination component. Instead, the infrastructure or framework for a data acquisition component, an analytics component, and a results dissemination component are provided for the developer. The components provided by the developer are instantiated in the provided framework to create an end-to-end data analytics service.

FIG. 1 shows a block diagram of a data analytics system 100, according to an example embodiment. As shown in FIG. 1, data analytics system 100 includes a development portal 102, a management portal 104, and a service 106 that is a service for a data analytics application 110. Deployment portal 102 is configured to provide an interface (e.g., a tool, etc.) for a developer to configure and package components of a data analytics application. Examples of the components include an input data definition (or model), a reference data definition (or model), and a data analytics logic definition (e.g., one or more queries). Deployment portal 102 packages the components in a data analytics application package 108 (e.g., a file or other container) that is transportable and may be deployed to create an instance of the data analytics application.

As shown in FIG. 1, management portal 104 may receive data analytics application package 108, and may create an instance of the data analytics application defined by data analytics application package 108 by unpacking the components contained therein. For instance, as shown in FIG. 1, management portal 104 may deploy data analytics application package 108 at service 106 to create a data analytics application 110 that is hosted by service 106. Service 106 provides a framework for data analytics application 110, such as an input data interface, a reference data service, a data analytics engine, and an output data interface (e.g., a user or client interface). Service 106 may be a network or cloud-based service so that clients may receive output information from data analytics application 110. Any number of instances of data analytics application 110 may be deployed at one or more services as data analytics services based on data analytics application package 108.

The elements of data analytics system 100 shown in FIG. 1 may be configured in various ways, in embodiments. Example embodiments for data analytics system 100 are described in the following subsections.

A. Example Embodiments for Developing a Deployable Data Analytics Application As described above, deployment portal 102 is configured to provide an interface for a developer to configure components of a data analytics application, and to generate data analytics application package 108, which is a transportable and deployable container to that may be used to generate instances of the data analytics application. Deployment portal 102 may be configured in various ways, and may perform its functions in various ways.

Figure 2:
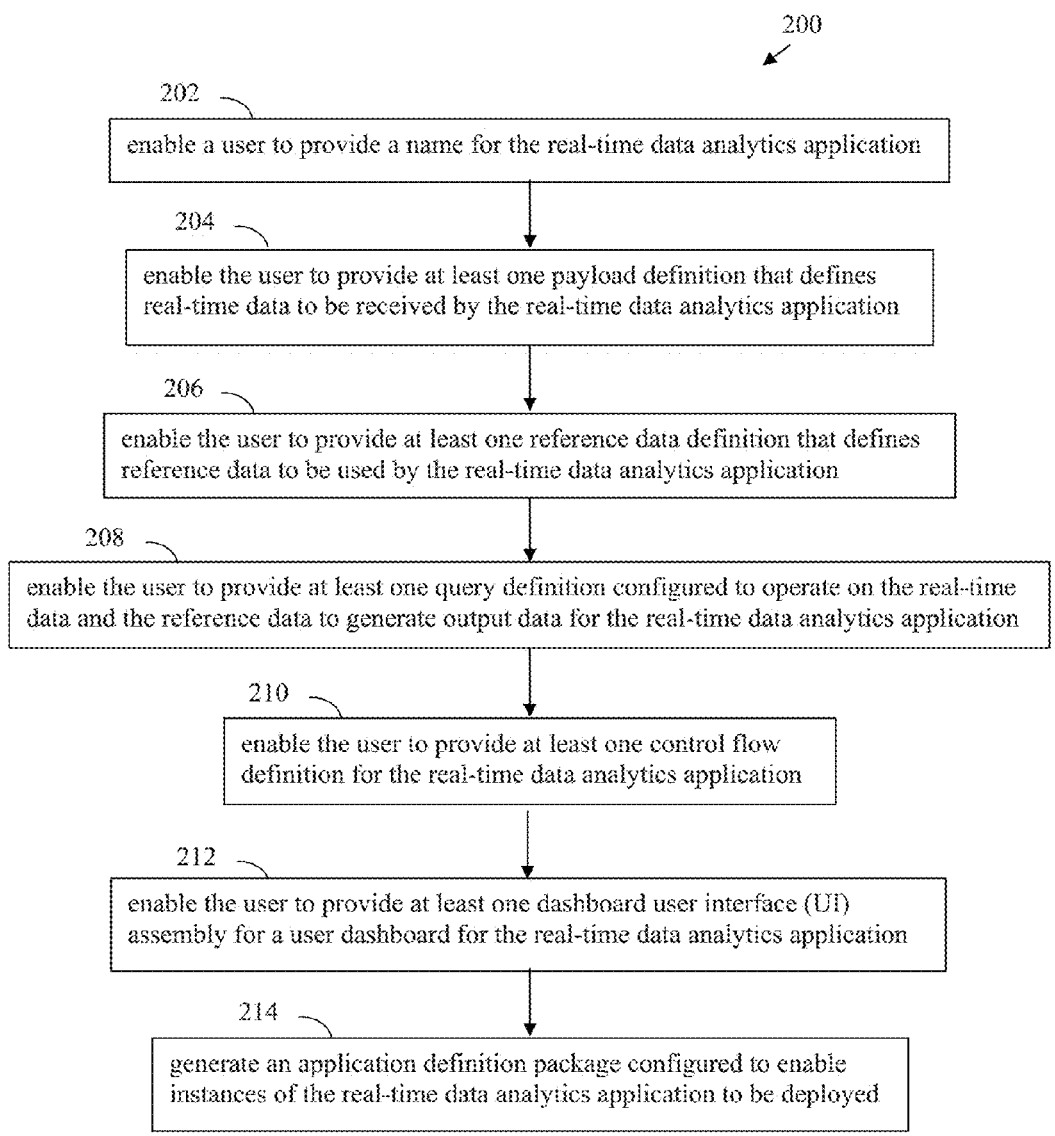
FIG. 2 shows a flowchart providing a process for enabling a user to develop a deployable data analytics application package, according to an example embodiment.
Figure 3:
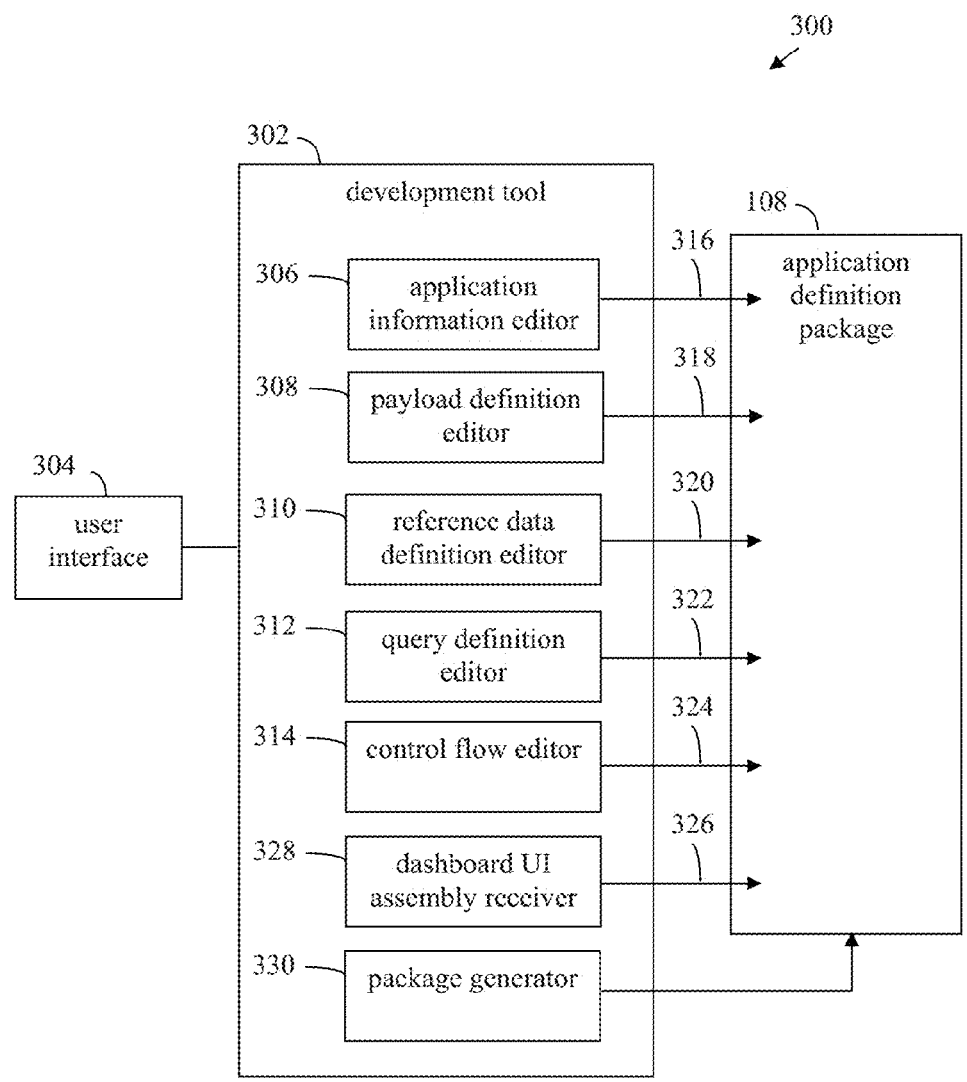
FIG. 3 shows a block diagram of a data analytics application development system, according to an example embodiment.

For instance, FIG. 2 shows a flowchart 200 providing a process for enabling a user to develop a deployable data analytics application package, according to an example embodiment. In an embodiment, flowchart 200 may be performed by deployment portal 102. For purposes of illustration, flowchart 200 of FIG. 2 is described with respect to FIG. 3. FIG. 3 shows a block diagram of a data analytics application development system 300, according to an example embodiment. Data analytics application development system 300 is an example of development portal 102 of FIG. 1. As shown in FIG. 3, data analytics application development system 300 includes a development tool 302 and a user interface 304 generated by development tool 302. Development tool 302 includes an application information editor 306, a payload definition editor 308, a reference data definition editor 310, a query definition editor 312, a control flow editor 314, a dashboard UI assembly receiver 328, and a package generator 330. Flowchart 200 and data analytics application development system 300 are described as follows. Note that not every step of flowchart 200 is performed in every embodiment, and the steps of flowchart 200 may be performed in other orders. Further structural and operational embodiments will be apparent to persons skilled in the relevant art(s) based on the following description.

Development tool 302 is a tool that a developer may interact with to generate a deployable package for a data analytics application, such as application definition package 108. Development tool 302 may be implemented in various ways. For instance, development tool 302 may be implemented in a computing device that the developer interacts with directly, including in the form of an application such as a desktop application, a mobile app, or a Web app. Alternatively, development tool 302 may be implemented in a remote computing device (e.g., a server) that transmits user interface 304 to a computing device of the developer in the form of a web page, and the web page is displayed to the developer in a web browser.

Examples of a suitable computing device include a stationary computer (e.g., a personal computer, a server, etc.) or a mobile computing device such as a handheld device (e.g., a Palm® device, a RIM Blackberry® device, a personal digital assistant (PDA)), a laptop computer, a notebook computer, a tablet computer (e.g., an Apple iPad™, a Microsoft Surface™, etc.), a netbook, a mobile phone (e.g., a smart phone such as an Apple iPhone, a Google Android™ phone, a Microsoft Windows® phone, etc.), or other type of computing device. Examples of web browsers include Internet Explorer®, developed by Microsoft Corp. of Redmond, Wash., Mozilla Firefox®, developed by Mozilla Corp. of Mountain View, Calif., and Google® Chrome of Mountain View, Calif.

User interface 304 may have any number and combination of user interface elements that may be interacted with by a developer. For instance, user interface 304 may be a graphical user interface (GUI) that includes one or more graphical user interface controls (e.g., text entry boxes, pull down menus, radio buttons, check boxes, etc.). User interface 304 may be interacted with by a user in any manner, such as by a keyboard, a thumb wheel, a pointing device, a roller ball, a stick pointer, a touch sensitive display (e.g., by using gesture input), a voice recognition system, and/or other user interface elements described elsewhere herein or otherwise known.

As shown in FIG. 2, flowchart 200 begins with step 202. In step 202, a user is enabled to provide a name for the real-time data analytics application. For example, in an embodiment, application information editor 306 may generate a user interface control that enables a developer to provide a name for a real-time data analytics application being developed by the developer. For instance, the developer may type in the application name, may speak the application name, or provide the application name in another manner to user interface 304, to have the application name received by application information editor 306. Application information editor 306 may output the application name in application information 316 in any form, including as a file (e.g., a text file, an XML file, etc.).

In embodiments, a user may be enabled to provide further application information in this manner. For instance, the user may be able to interact with a user interface control generated by application information editor 306 to configure security characteristics for the real-time data analytics application, such as being enabled to configure an authentication type or an authorization policy. The authentication type may be used by an authentication module to authenticate users and/or devices that attempt to communicate with the real-time data analytics application over a network. Examples of authentication types include passwords, Kerberos, public key encryption, etc. The authorization policy may be used by an authorization module to provide access control for purposes of information security, to control users and/or devices that can interact with a particular resource of the real-time data analytics application over a network (e.g., to define access rights, such as read, write, and execute rights). Examples of authorization policies include the use of access control lists, capability-based security, etc. Application information editor 306 may indicate the security characteristics in application information 316.

In step 204, the user is enabled to provide at least one payload definition that defines real-time data to be received by the real-time data analytics application. For instance, in an embodiment, payload definition editor 308 may generate a user interface control that enables a developer to provide one or more payload definitions. A payload definition defines a format of real-time data received from one or more real-time data collection entities. "Real-time data" refers to data that is delivered for processing as soon as it is collected/generated, and typically is data that changes over time. For instance, a payload definition may define an identifier for a data structure or object received as real-time data, one or more data fields/properties of the identified data structure, and/or one or more further aspects of received real-time data. As such, the user may type in a payload definition, provide a payload definition by voice, or provide a payload definition in another manner to user interface 304, to have the payload definition received by payload definition editor 308. Any number of payload definitions may be provided for a particular real-time data analytics application, to define corresponding different types of real-time data to be received. Payload definition editor 308 may output the one or more payload definitions in payload definition(s) 318 in any form, including as a file (e.g., a text file, an XML file, etc.).

For instance, in a city bus transportation data analytics application, an example payload definition may be provided for real-time data representative of the travel of city buses along their routes within a city. Such a payload definition may be identified as "bus travel data" and may include one or more fields such as a bus identifier, a bus location (e.g., coordinates), a bus velocity, a bus travel direction, and a timestamp.

In step 206, the user is enabled to provide at least one reference data definition that defines reference data to be used by the real-time data analytics application. For instance, in an embodiment, reference data definition editor 310 may generate a user interface control that enables a developer to provide one or more reference data definitions. A reference data definition defines a format of reference data received from a reference data source. "Reference data" refers to fixed data associated with a real-time data analytics application. For instance, a reference data definition may define an identifier for a data structure or object for reference data, one or more data fields/properties of the identified data structure, and/or one or more further aspects of reference data. As such, the user may type in a reference data definition, provide a reference data definition by voice, or provide a reference data definition in another manner to user interface 304, to have the reference data definition received by reference data definition editor 310. Any number of reference data definitions may be provided for a particular real-time data analytics application, to define corresponding different types of reference data to be received. Reference data definition editor 310 may output the one or more reference data definitions in reference definition(s) 320 in any form, including as a file (e.g., a text file, an XML file, etc.).

For instance, continuing the city bus transportation data analytics application, an example reference data definition may be provided for locations of bus stops, which are fixed locations. Such a reference data definition may be identified as "bus stop location data" and may include one or more fields such as a bus stop identifier, and a bus stop location (e.g., coordinates).

In step 208, the user is enabled to provide at least one query definition configured to operate on the real-time data and the reference data to generate output data for the real-time data analytics application. For instance, in an embodiment, query definition editor 312 may generate a user interface control that enables a developer to provide one or more query definitions. A query definition defines data analytics logic to be performed on real-time data (defined according to one or more payload definitions) and optionally on reference data (defined according to one or more reference data definitions) to generate output data for a real-time data analytics application. A query definition may be formatted in any suitable manner, including as a formula or equation, in the form of a computer program (e.g., XML, JavaScript, C++, etc.), or in another manner. As such, the user may type in a query definition, provide a query definition by voice, load a query definition from a document, or provide a query definition in another manner to user interface 304, to have the query definition received by query definition editor 312. Query definition editor 312 may provide for automatic code completion to assist entry of query definitions, in an embodiment. Any number of query definitions may be provided for a particular real-time data analytics application, to define corresponding queries to be performed. Query definition editor 312 may output the one or more query definitions in query definition(s) 322 in any form, including as a file (e.g., a text file, an XML file, etc.).

For instance, continuing the city bus transportation data analytics application, an example query definition may be provided for to determine the number of buses traveling over 50 Km/hr within a 1 minute time range. In another example, a query definition may be provided to determine which buses are within 1 minute of reaching a bus stop at a particular time.

In step 210, the user is enabled to provide at least one control flow definition for the real-time data analytics application. For instance, in an embodiment, control flow editor 314 may generate a user interface control that enables a developer to provide one or more control flows (also referred to as workflows). A control flow defines control logic to be performed to control the flow of output data from the real-time data analytics application. For instance, in an embodiment, a control flow may synchronize the providing of output data and/or may define other control related functions. A control flow may be formatted in any suitable manner, including in the form of a table, as a computer program, or in another manner. As such, the user may type in a control flow, provide a control flow by voice, load a control flow from a document, or provide a control flow in another manner to user interface 304, to have the control flow received by control flow editor 314. Any number of control flows may be provided for a particular real-time data analytics application. Control flow editor 314 may output the one or more control flows in control flow definition(s) 324 in any form, including as a file (e.g., a text file, an XML file, etc.).

For instance, continuing the city bus transportation data analytics application, an example control flow may be provided that synchronizes the output data indicating the determined number of buses traveling over 50 Km/hr and the determined buses that are within 1 minute of reaching a bus stop, to a same 1 minute time span.

In step 212, the user is enabled to provide at least one dashboard user interface (UI) assembly for a user dashboard for the real-time data analytics application. For instance, in an embodiment, dashboard UI assembly receiver 328 may generate a user interface control that enables a developer to provide one or more dashboard UI assemblies. A dashboard UI assembly defines a user interface output display element that can be displayed in a user dashboard (e.g., in a web page or other user interface) for providing the output data of the real-time data analytics application to users (e.g., to customers). Any type and number of user interface output display elements may be provided as dashboard UI assemblies, including images, maps, tables, charts, graphs, UI elements defined in program code (e.g., XML, JavaScript, etc.), etc., for displaying output data. An application dashboard page definition may be provided in the form of program code (e.g., XML, HTML, etc.) that defines a layout of the application dashboard, including locations for any provided dashboard UI assemblies. As such, the user may upload or provide dashboard UI assemblies (and application dashboard page definition) in any manner to user interface 304, to be received by dashboard UI assembly receiver 328. Any number of dashboard UI assemblies may be provided for a particular real-time data analytics application. Dashboard UI assembly receiver 328 may output the one or more dashboard UI assemblies (and application dashboard page definition) in dashboard UI assemblies 326.

For instance, continuing the city bus transportation data analytics application, an example first dashboard UI assembly of a table showing lists of buses determined to be traveling over 50 Km/hr and buses within 1 minute of reaching a bus stop, and a second dashboard UI assembly that is a city map showing locations of bus stops in the city, and locations of the buses listed in the table.

In another embodiment, dashboard UI assembly receiver 328 may generate a user interface control that enables a developer to provide an application icon that may be used to identify the real-time data analytics application in a list of such applications, and to provide further types of dashboard UI assemblies.

Referring back to FIG. 2, in step 214, an application definition package is generated that is configured to enable instances of the real-time data analytics application to be deployed. For example, in an embodiment, package generator 330 may be configured to generate application definition package 108 to include the generated components for the data analytics application. For instance, package generator 330 may include one or more of application information 316, payload definition(s) 318, reference data definition(s) 320, query definition(s) 322, control flow definition(s) 324, and dashboard UI assemblies 326. Package generator 330 may generate application definition package 108 in various ways, including as a single file that is compressed (e.g., a .ZIP file) or is not compressed, as a folder containing multiple files, etc. In an embodiment, package generator 330 may generate an application manifest file that lists the components included in application definition package 108, and may include the application manifest file in application definition package 108.

B. Example Embodiments for Deploying a Data Analytics Application

As described above with respect to FIG. 1, management portal 104 may be interacted with by a user to create an instance of the data analytics application defined by data analytics application package 108. For instance, as shown in FIG. 1, management portal 104 may deploy data analytics application package 108 at service 106 to create a data analytics application 110 that is hosted by service 106. Management portal 104 may be configured in various ways, and may perform its functions in various ways.

Figure 4:
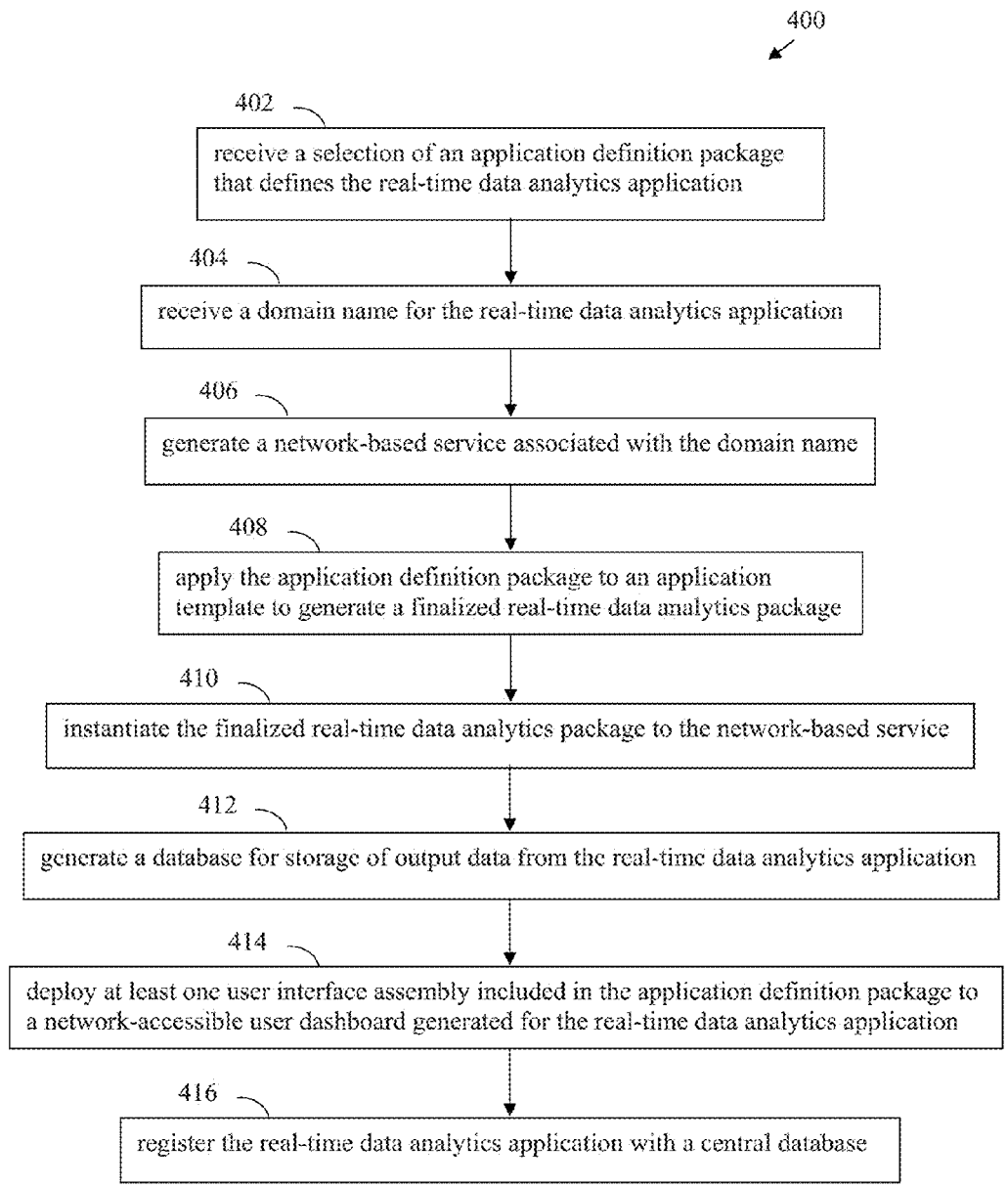
FIG. 4 shows a flowchart providing a process for deploying a data analytics application based on a deployable data analytics application package, according to an example embodiment.
Figure 5:
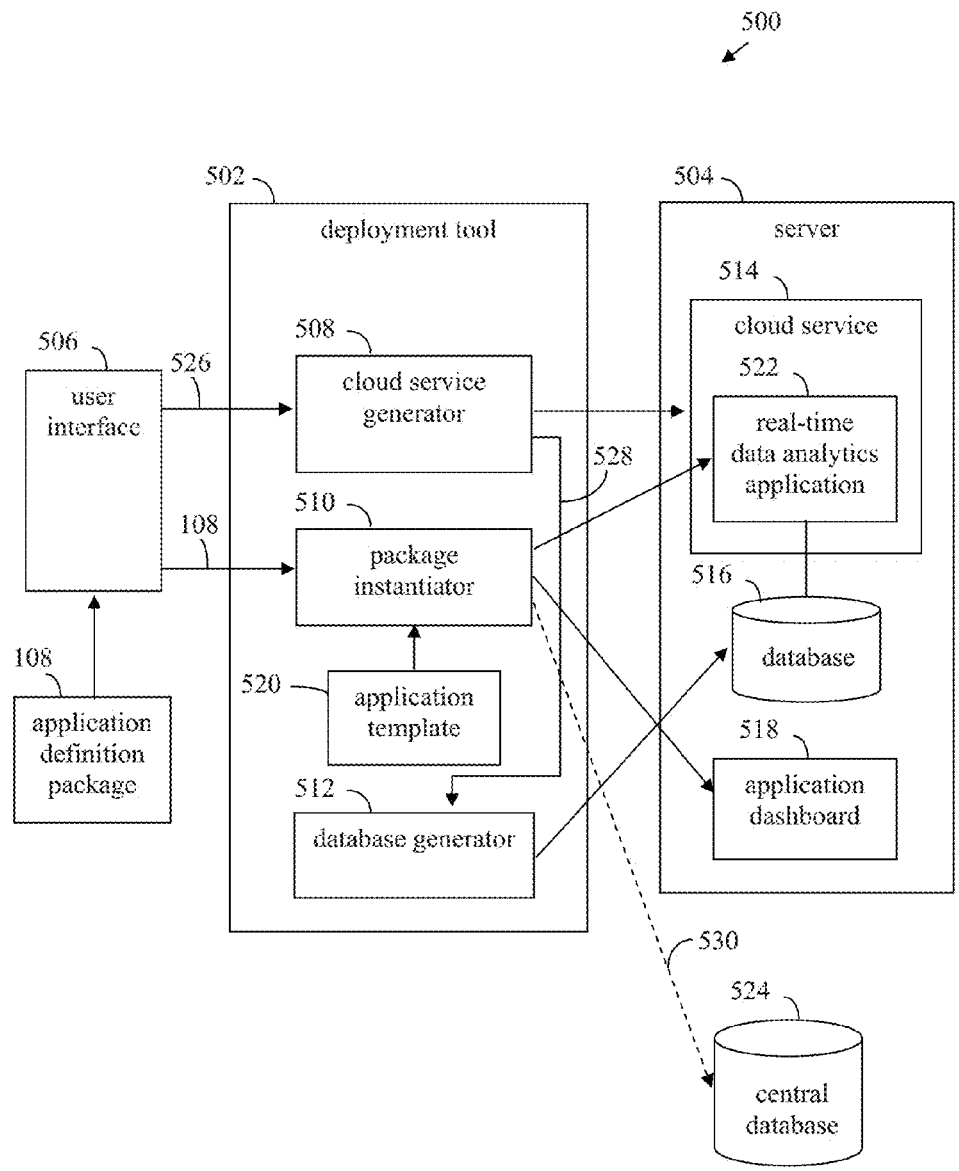
FIG. 5 shows a block diagram of a data analytics application management system, according to an example embodiment.

For instance, FIG. 4 shows a flowchart 400 providing a process for deploying a data analytics application based on a deployable data analytics application package, according to an example embodiment. In an embodiment, flowchart 400 may be performed by management portal 104. For purposes of illustration, flowchart 400 of FIG. 4 is described with respect to FIG. 5. FIG. 5 shows a block diagram of a data analytics application management system 500, according to an example embodiment. Data analytics application management system 500 is an example of management portal 104 of FIG. 1. As shown in FIG. 5, data analytics application management system 500 includes a deployment tool 502, a server 504, and a user interface 506 generated by deployment tool 502. Deployment tool 502 includes a cloud service generator 508, a package instantiator 510, and a database generator 512. Server 504 includes a cloud service 514, which is an example of service 106 in FIG. 1. Flowchart 400 and data analytics application management system 500 are described as follows. Note that not every step of flowchart 400 is performed in every embodiment, and the steps of flowchart 400 may be performed in other orders. Further structural and operational embodiments will be apparent to persons skilled in the relevant art(s) based on the following description.

Deployment tool 502 is a tool that a user (e.g., a customer, etc.) may interact with to generate a data analytics application based on a deployable data analytics application package, such as application definition package 108. Deployment tool 502 may be implemented in various ways, including in a similar fashion as development tool 302 of FIG. 3 (e.g., as an application in a remote or local computing device).

Similarly, user interface 506 may be implemented similarly to user interface 304 of FIG. 3 (e.g., as a user interface of a local application, a web page displayed in a browser, etc.). User interface 506 may be configured in any manner, and may have any number and combination of user interface controls that may be interacted with by a user, including the user interface configurations and controls described above and those that are otherwise known.

In FIG. 4, flowchart 400 begins with step 402. In step 402, a selection is received of an application definition package that defines the real-time data analytics application. For example, as shown in FIG. 5, a user may interact with user interface 506 (e.g., a customer dashboard) to select application definition package 108 for deployment as a network-based real-time data analytics service. For instance, package 108 may be selected from a list of packages displayed in user interface 506. In one embodiment an application icon and/or an application name (as described above) may be displayed in user interface 506 to identify package 108 for selection (in a list of other application names and/or application icons). Upon selection, application definition package 108 may be loaded by deployment tool 502 (e.g., into memory).

In an embodiment, when package 108 is loaded, deployment tool 502 (e.g., package instantiator 510) may verify package 108. For instance, the contents of package 108 may be analyzed to determine whether all components are present (e.g., as indicated by an application manifest, etc.), and each component may be analyzed to determine whether it is valid. For instance, header information may be analyzed, error checking may be performed, and/or further verification processes may be performed.

In step 404, a domain name is received for the real-time data analytics application. For example, as shown in FIG. 5, a user may interact with user interface 506 to input a domain name for the network-based real-time data analytics service that is being deployed. For instance, the user may type in the domain name, may speak the domain name, or provide the domain name in another manner to user interface 506, to have the domain name received by cloud service generator 508.

In step 406, a network-based service associated with the domain name is generated. For example, in an embodiment, cloud (network-based) service generator 508 may generate a cloud service 514 (a network-based service) that is hosted by server 504. Cloud service 514 may be hosted at server 504 to be accessible at the domain name provided by the user (in step 404). Cloud service 514 is configured to provide the real-time data analytics application as a service over a network. The network may be a local area network (LAN), a wide area network (WAN), or a combination of networks, such as the Internet. Cloud service 514 may host a website that includes at least one web page (an application dashboard) that enables users to access output data from the real-time data analytics application using a web browser, a mobile, or other application. Furthermore, cloud service 514 may host a web page that is a back-end monitoring console for monitoring the health and/or other activity of the real-time data analytics application. Still further, cloud service 514 may host an address to which real-time data may be transmitted to be used by the real-time data analytics application.

For instance, in one illustrative example, when a user provides a domain name of "foo" to user interface 506, in response, cloud service generator 508 may assign the following URLs for the resulting cloud service:

http://foo.cloudapp.net—this is a network address for the application dashboard http://foo.cloudapp.net/EventReceiver—this is a network address to which real-time data collection devices send real-data http://foo.cloudapp.net/monitor: this is a network address for a back-end monitoring console These URLs may be displayed to the user in user interface 506 or provided to the user in any other manner.

In step 408, the application definition package is applied to an application template to generate a finalized real-time data analytics package. As shown in FIG. 5, package instantiator 510 receives application definition package 108. In an embodiment, package instantiator 510 may un-package package 108, and optionally apply the components of package 108 to an application template to generate a finalized real-time data analytics package. For instance, an application template may be present that includes fillable blanks, fillable program code portions, configurable parameters, and/or other fillable or configurable portions that may be filled and/or configured by the components of a real-time data analytics application package to generate a corresponding fully-configured, end-to-end real-time data analytics service. In this manner, any number of different types of real-time data analytics services/applications may be generated by filling in a generic application template with application-specific information from a data analytics application package.

For instance, FIG. 5 shows an application template 520 that may be received by package instantiator 510. Package instantiator 510 may configure application template 520 according to data analytics application package 108 to generate a finalized data analytics application package for deployment to cloud service 514. In embodiments, application template 520 may include one or more of the following configurable data analytics application portions, including a data analytics engine, an application monitor, an authentication module, an authorization module, an event collector, a reference data service, a state engine, and a user dashboard. These portions of application template 520 are further described in the next subsection.

In step 410, the finalized real-time data analytics package is instantiated to the network-based service. For instance, as shown in FIG. 5, package instantiator 510 may deploy a real-time analytics application 522 at cloud service 514 based on application definition package 108. When activated, cloud service 514 provides real-time data analytics application 522 as a service over a network, including hosting web pages for real-time data analytics application 522 at the associated domain name, as described above. Further detail on the deployment of a real-time analytics application at a cloud service is described in the following subsection.

In step 412, a database is generated for storage of output data from the real-time data analytics application. For example, as shown in FIG. 5, cloud service generator 508 may provide a generate database instruction 528 to database generator 512. In response, database generator 512 generates a database 516, which is coupled to real-time data analytics application 522. Database 516 is configured to receive, store, and organize data associated with real-time data analytics application 522, including output data generated thereby. Database 516 may be an SQL (structured query language)-based database, or other type of database 516, as would be known to persons skilled in the relevant art(s).

In step 414, at least one user interface assembly included in the application definition package is deployed to a network-accessible user dashboard generated for the real-time data analytics application. For example, as described above, package 108 may include one or more dashboard UI assemblies for a user dashboard. In an embodiment, package instantiator 510 may unpack and provide the one or more dashboard UI assemblies to server 504 to be included in an application dashboard 518. Application dashboard 518 includes one or more network-accessible web pages hosted by cloud service 514 at the network address assigned by cloud service generator 508 (e.g., http://foo.cloudapp.net) as described above. The one or more dashboard UI assemblies may be included in the one or more web pages for display to users (e.g., at clients) to enable and/or enhance the display of output data. The one or more dashboard UI assemblies may be arranged according to a application dashboard page definition, when present.

In step 416, the real-time data analytics application is registered with a central database. For example, as shown in FIG. 5, package instantiator 510 may generate a registration request 530 that is transmitted to a central database 524. Central database 524 may be associated with server 504 or may be located at another computing device. Registration request 530 causes central database 524 to indicate real-time data analytics application 522 in a list of active data analytics applications maintained thereby. Furthermore, an indication of whether real-time data analytics application 522 is running or is stopped, and/or further status information regarding real-time data analytics application 522 may be indicated in central database 524.

Furthermore, upon instantiating real-time data analytics application 522, a user may interact with user interface 506 to perform one or more functions, such as starting real-time data analytics application 522, stopping real-time data analytics application 522, removing real-time data analytics application 522, etc.

C. Example Embodiments for a Data Analytics Application Deployed to a Cloud Service As described above with respect to steps 408 and 410 of flowchart 400 (FIG. 4), an instance of a data analytics application may be generated deployment tool 502 of FIG. 4 by applying a data analytics application package to an application template, and instantiating the results to a cloud service.

Figure 6:
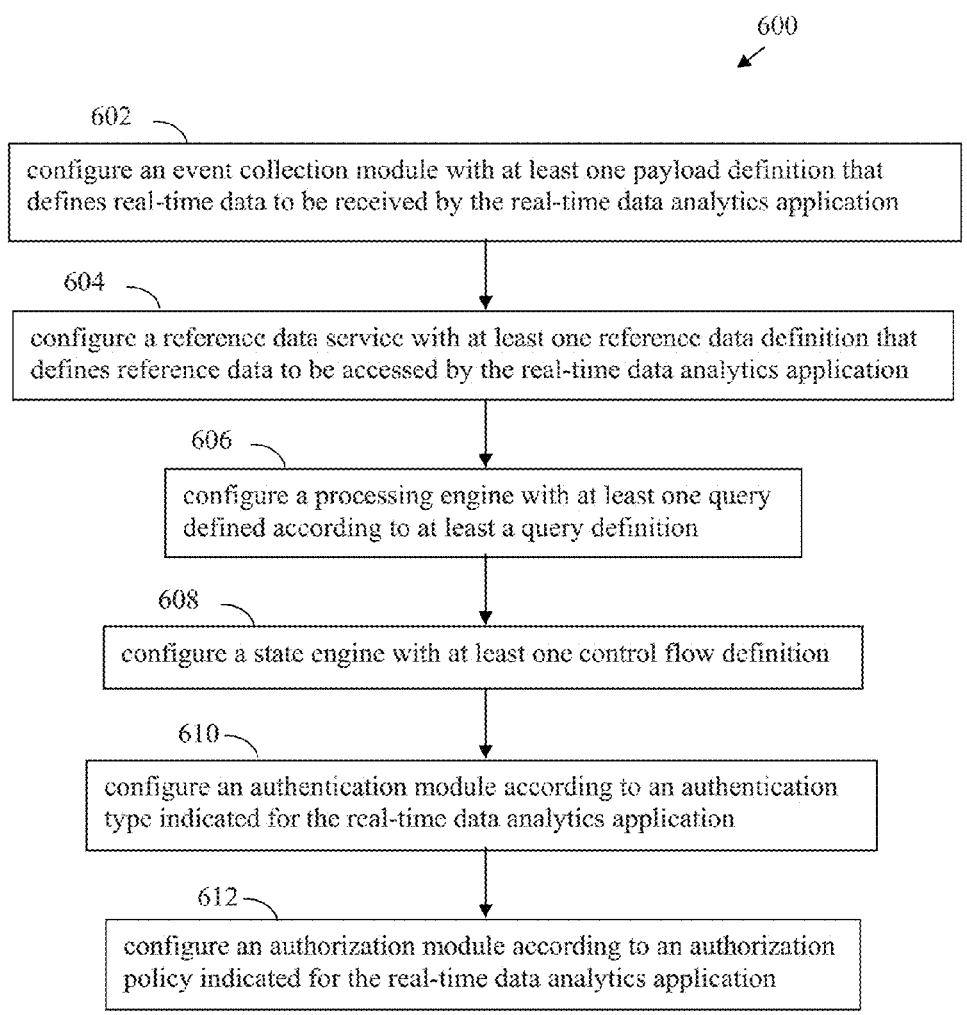
FIG. 6 shows a flowchart providing a process for operating a data analytics application deployed as a service from a data analytics application package, according to an example embodiment.

FIG. 6 shows a flowchart providing a process for operating a data analytics application deployed as a service from a data analytics application package, according to an example embodiment. In an embodiment, flowchart 600 may be performed by package instantiator 510 of FIG. 5. Flowchart 600 is described as follows with respect to FIGS. 7-9. Note that not every step of flowchart 600 is performed in every embodiment, and the steps of flowchart 600 may be performed in other orders than the order shown in FIG. 6. Further structural and operational embodiments will be apparent to persons skilled in the relevant art(s) based on the following description.

In FIG. 6, flowchart 600 begins with step 602. In step 602, an event collection module is configured with at least one payload definition that defines real-time data to be received by the real-time data analytics application. In an embodiment, package instantiator 510 may configure an event collection module of application template 520 with one or more payload definitions (e.g., payload definition(s) 318 of FIG. 3) received in package 108. The event collection module is configured to receive real-time data. When configured by package instantiator 510, the event collection module is capable of receiving real-time data configured according to the one or more payload definitions.

Figure 7:
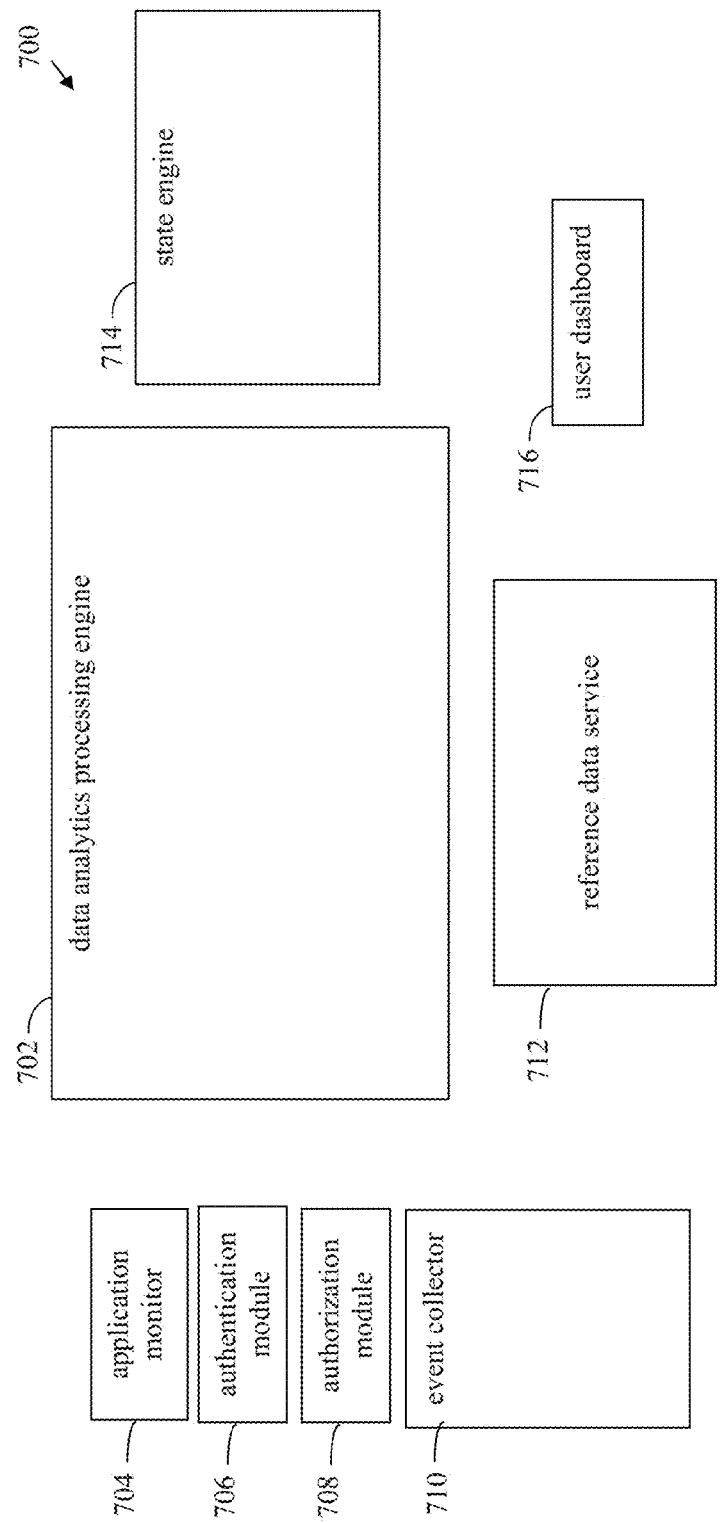
FIG. 7 shows a block diagram of an application template that can be configured by a data analytics application package to operate as a data analytics service, according to an example embodiment.

For instance, FIG. 7 shows a block diagram of an application template 700 that can be configured by a data analytics application package to operate as a data analytics service, according to an example embodiment. FIG. 7 shows a graphical representation of application template 700, which may actually be implemented in the form of program code (e.g., XML code, JavaScript code, C++ code, etc.). As shown in FIG. 7, application template 700 includes a data analytics processing engine 702, an application monitor 704, an authentication module 706, an authorization module 708, an event collector 710, a reference data service 712, a state engine 714, and a user dashboard 716. One or more of these features of application template 700 may not be present in some embodiments. Application template 700 may be populated by components of an application definition package, and hosted in a cloud service, to generate a real-time data analytics service.

Figure 8:
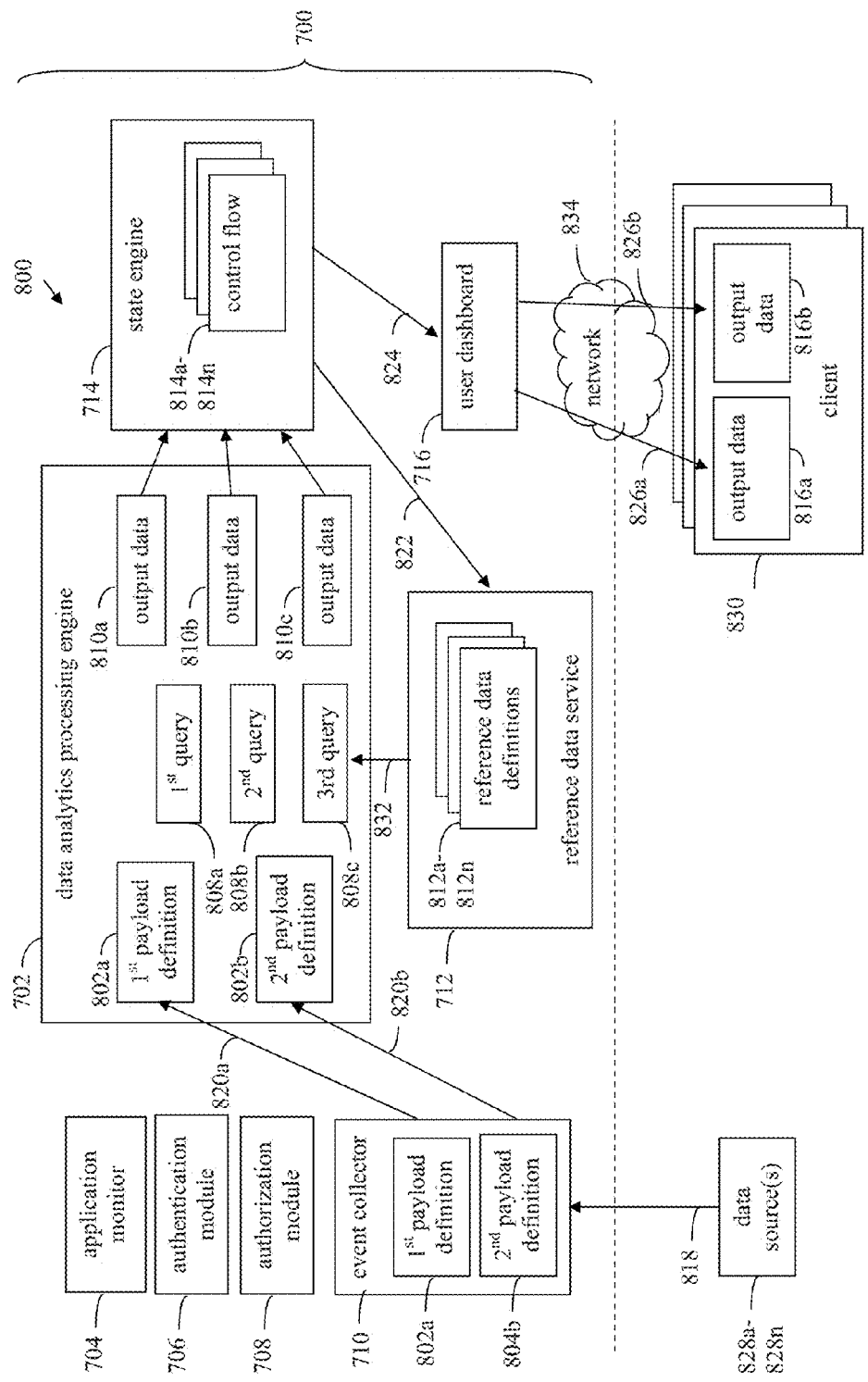
FIG. 8 shows a block diagram of the application template of FIG. 7 configured according to a data analytics application package to implement a full data analytics service, according to an example embodiment.

Event collector 710 of FIG. 7 is configured to receive real-time data. When configured by package instantiator 510, event collector 710 is capable of receiving real-time data configured according to the one or more payload definitions. For instance, FIG. 8 shows a block diagram of application template 700 of FIG. 7 configured according to a data analytics application package to implement a full data analytics application service 800, according to an example embodiment. As shown in FIG. 8, event collector 710 is configured with a first payload definition 802a and a second payload definition 802b. First and second payload definitions 802a and 802b define first and second types of real-time data that can be received by event collector 710 (during operation of service 800), as described further above. Note that in embodiments, event collector 710 may be configured with any number of payload definitions, corresponding to the number of different types of real-time data to be received.

As shown in FIG. 8, event collector 710 receives real-time data 818 that is generated and/or collected by one or more data sources 828a-828n. Data sources 828a-828n may include one or more stationary devices, mobile devices, etc, that include sensors of any suitable type. Data sources 828a-828n collect and/or generate real-time data, and provide real-time data 818 to event collector 710 in a wired and/or wireless fashion.

Figure 9:
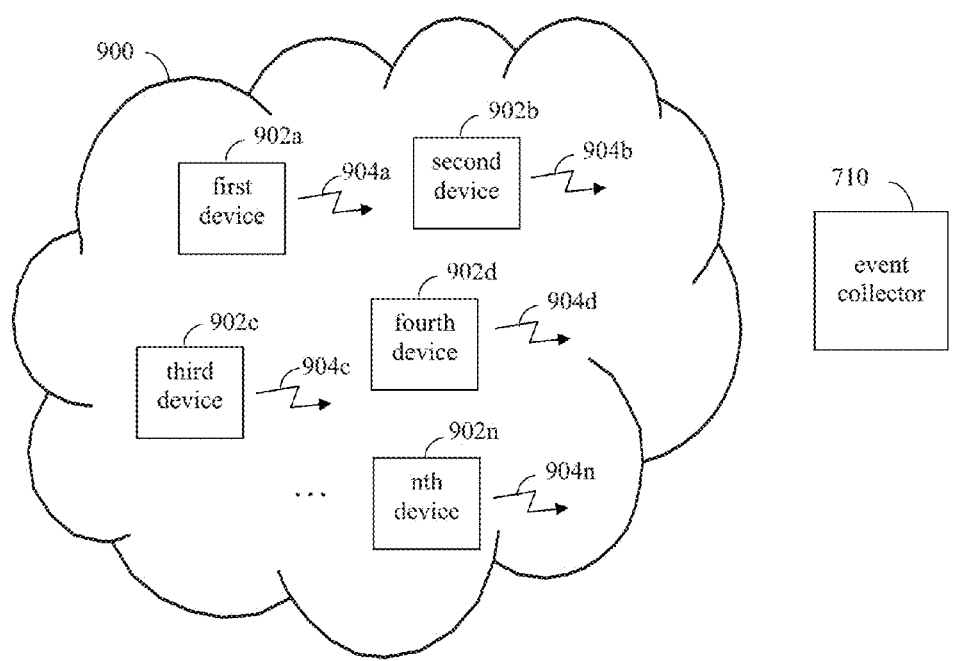
FIG. 9 shows a block diagram of a data acquisition network that provides data to an event collector of a cloud-based data analytics service, according to an example embodiment.

For instance, FIG. 9 shows a block diagram of a data acquisition network 900 that provides data to event collector 710 of a cloud-based data analytics service, according to an example embodiment. Data acquisition network 900 is an example of a network of data acquisition devices provided for purposes of illustration. As shown in FIG. 9, data acquisition network 900 includes first-nth devices 902a-902n. First-nth devices 902a-902n are examples of data source(s) 828a-828n in FIG. 8. Each of devices 902a-902n is configured to collect (e.g., sense) data and/or to generate real-time data. Examples of devices 902a-902n include stationary devices and mobile devices that may each include one or more sensors, processors or other logic, and/or other features for collecting and/or generating data. For instance, sensors may measure speed, temperature, pressure, orientation, amounts of data transmitted, and/or any further parameters that may be expressed as data. Devices 902a-902n may be capable of transmitting such data as real-time data 904a-904n, respectively, in a wireless or wired manner. Any type of real-time data may be generated and/or collected. Event collector 710 may receive real-time data 904a-904n in any manner. In FIG. 8, real-time data 904a-904n includes real-time data formatted according to first payload definition 804a and according to second payload definition 804b.

For instance, continuing the city bus transportation example, devices 902a-902n may be location, velocity, and orientation sensors carried on city buses. Real-time data 904a-904n may include the real-time data collected by devices 902a-902n, including a bus location, a bus velocity, a bus travel direction, and a timestamp, as well as including a bus identifier.

Referring back to FIG. 6, in step 604, a reference data service is configured with at least one reference data definition that defines reference data to be accessed by the real-time data analytics application. In an embodiment, package instantiator 510 may configure a reference data service of application template 520 with one or more reference data definitions (e.g., reference data definition(s) 320 of FIG. 3) received in package 108. For instance, reference data service 712 of application template 700 in FIG. 7 may be configured by package instantiator 510 with reference data definitions 812a-812n, as shown in FIG. 8. When configured by package instantiator 510, reference data service 712 is capable of receiving and/or maintaining reference data (e.g., stored in a database or other storage) configured according to reference data definitions 812a-812n. During operation of service 800, data analytics processing engine 702 may request reference data from reference data service 712 for use in processing queries.

In step 606, a processing engine is configured with at least one query defined according to at least a query definition. In an embodiment, package instantiator 510 may configure data analytics processing logic of application template 520 with one or more query definitions (e.g., query definition(s) 322 of FIG. 3) received in package 108. For instance, data analytics processing engine 702 of application template 700 in FIG. 7 may be configured by package instantiator 510 with queries 808a-808c (based on corresponding query definitions), as shown in FIG. 8. When configured by package instantiator 510, data analytics processing engine 702 is capable of receiving reference data 832 from reference data service 712 (formatted according to reference data definitions 812a-812n) and real-time data 820a and 820b from event collector 710 (formatted according to payload definitions 802a and 802b). During operation of service 800, data analytics processing engine 702 executes queries 808a-808c, which each use real-time data 820a and 802b and/or reference data 812a-812n, to generate output data 810a-810c.

In step 608, a state engine is configured with at least one control flow definition. In an embodiment, package instantiator 510 may configure a state engine of application template 520 with one or more control flow definitions (e.g., control flow definition(s) 324 of FIG. 3) received in package 108. For instance, state engine 714 of application template 700 in FIG. 7 may be configured by package instantiator 510 with control flows 814a-814n (based on corresponding control flow definitions), as shown in FIG. 8. State engine 714 is configured to provide a "view of the world" for service 800, and may interact with data analytics processing engine 702, reference data service 712, and user dashboard 824 to perform its functions. When configured by package instantiator 510, state engine 714 is capable of synchronizing output data 810a-810c at user dashboard 716 as synchronized output data 824 according to control flows 814a-814n. In this manner, various output data generated by processing engine 702 for a particular time value may be provided for display together (e.g., in a common table row, in a map together, etc.) at user dashboard 716. Furthermore, in an embodiment, state engine 714 may provide a reference data control signal 822 to reference data service 832 to control the timing of reference data provided to data analytics processing engine 702 according to control flows 814a-814n.

During operation of service 800, one or more clients 830 may access user dashboard 716 for synchronized output data 824. Client(s) 830 may receive synchronized output data 824 from user dashboard 716 in a web page or other form, as output data 816a and 816b. Output data 816a and 816b may be received by client(s) 830 through a network 834 (e.g., a LAN, a WAN, a combination of networks such as the Internet, etc.). For instance, output data 816a and 816b may be displayed in the web page according to one or more dashboard UI assemblies provided in package 108, in one or more tables (displayed by a table viewer), or in another form.

In step 610, an authentication module is configured according to an authentication type indicated for the real-time data analytics application. In an embodiment, package instantiator 510 may configure an authentication module of application template 520 with an authentication type received in package 108 (e.g., in application information 316). For instance, authentication module 706 of application template 700 in FIG. 7 may be configured by package instantiator 510 with the authentication type. The authentication type may be used by authentication module 706 to authenticate client(s) 830 that attempt to communicate with service 800 over network 834. Examples of authentication types include passwords, Kerberos, public key encryption, etc.

In step 612, an authorization module is configured according to an authorization policy indicated for the real-time data analytics application. In an embodiment, package instantiator 510 may configure an authorization module of application template 520 with an authorization policy received in package 108 (e.g., in application information 316). For instance, authorization module 708 of application template 700 in FIG. 7 may be configured by package instantiator 510 with the authorization policy. The authorization policy may be used by authorization module 706 to provide access control for purposes of information security, to control client(s) 830 that can receive output data. Examples of authorization policies include the use of access control lists, capability-based security, etc.

III. Example Computing Device Embodiments

Development portal 102, management portal 104, service 106, data analytics application 110, development tool 302, application information editor 306, payload definition editor 308, reference data definition editor 310, query definition editor 312, control flow editor 314, dashboard UI assembly receiver 328, package generator 330, deployment tool 502, cloud service generator 508, package instantiator 510, database generator 512, cloud service 514, real-time data analytics application 522, data analytics processing engine 702, application monitor 704, authentication module 706, authorization module 708, event collector 710, reference data service 712, state engine 714, user dashboard 716, flowchart 200, flowchart 400, and flowchart 600 may be implemented in hardware, or hardware and any combination of software and/or firmware. For example, development portal 102, management portal 104, service 106, data analytics application 110, development tool 302, application information editor 306, payload definition editor 308, reference data definition editor 310, query definition editor 312, control flow editor 314, dashboard UI assembly receiver 328, package generator 330, deployment tool 502, cloud service generator 508, package instantiator 510, database generator 512, cloud service 514, real-time data analytics application 522, data analytics processing engine 702, application monitor 704, authentication module 706, authorization module 708, event collector 710, reference data service 712, state engine 714, user dashboard 716, flowchart 200, flowchart 400, and/or flowchart 600 may be implemented as computer program code configured to be executed in one or more processors and stored in a computer readable storage medium. Alternatively, development portal 102, management portal 104, service 106, data analytics application 110, development tool 302, application information editor 306, payload definition editor 308, reference data definition editor 310, query definition editor 312, control flow editor 314, dashboard UI assembly receiver 328, package generator 330, deployment tool 502, cloud service generator 508, package instantiator 510, database generator 512, cloud service 514, real-time data analytics application 522, data analytics processing engine 702, application monitor 704, authentication module 706, authorization module 708, event collector 710, reference data service 712, state engine 714, user dashboard 716, flowchart 200, flowchart 400, and/or flowchart 600 may be implemented as hardware logic/electrical circuitry.

For instance, in an embodiment, one or more of development portal 102, management portal 104, service 106, data analytics application 110, development tool 302, application information editor 306, payload definition editor 308, reference data definition editor 310, query definition editor 312, control flow editor 314, dashboard UI assembly receiver 328, package generator 330, deployment tool 502, cloud service generator 508, package instantiator 510, database generator 512, cloud service 514, real-time data analytics application 522, data analytics processing engine 702, application monitor 704, authentication module 706, authorization module 708, event collector 710, reference data service 712, state engine 714, user dashboard 716, flowchart 200, flowchart 400, and/or flowchart 600 may be implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
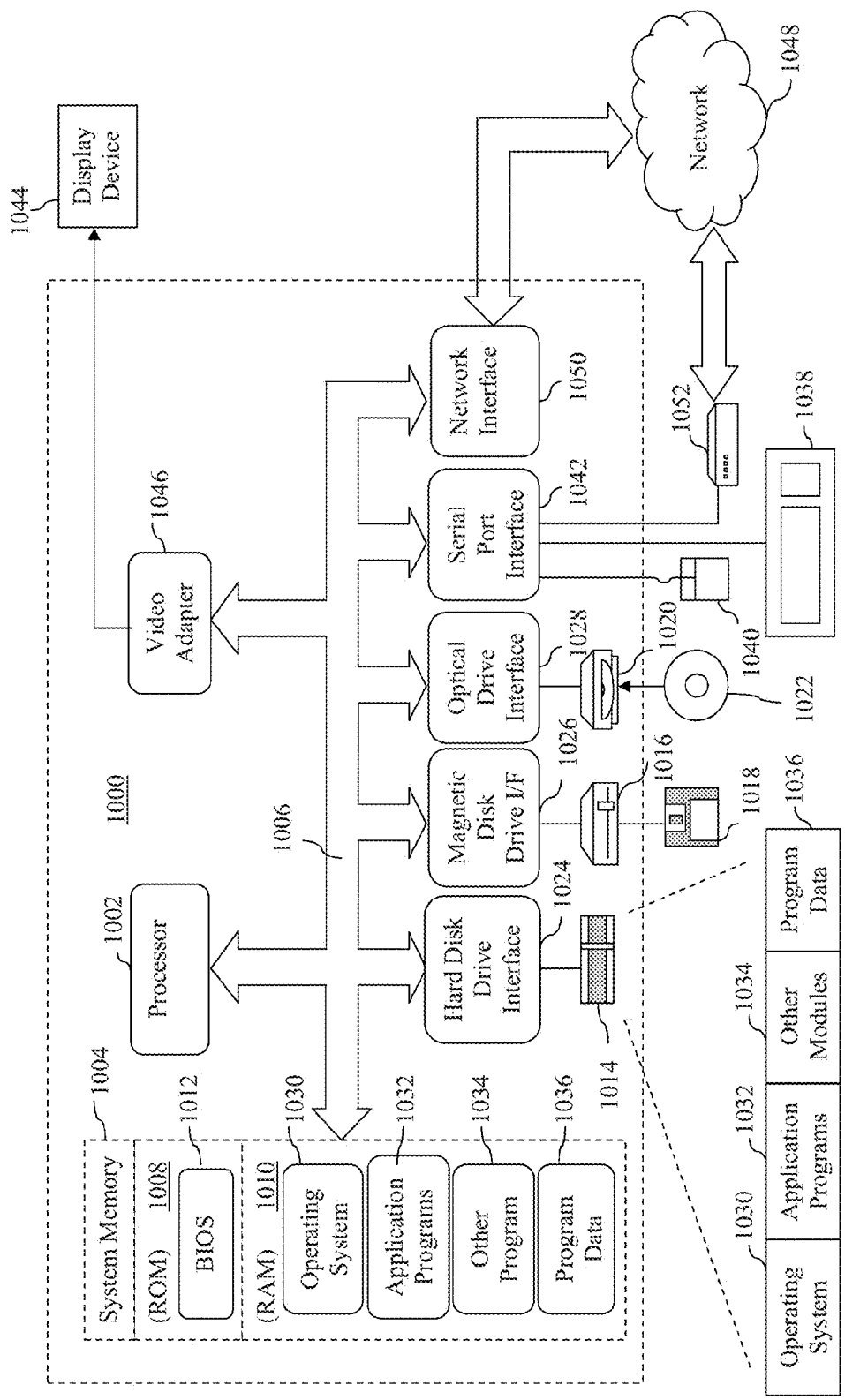
FIG. 10 shows a block diagram of an example computer that may be used to implement embodiments of the present invention.

FIG. 10 depicts an exemplary implementation of a computer 1000 in which embodiments of the present invention may be implemented. For example, deployment portal 102, management portal 104, service 106, development system 300, deployment tool 502, and/or server 504 may be implemented in one or more computer systems similar to computer 1000, including one or more features of computer 1000 and/or alternative features. The description of computer 1000 provided herein is provided for purposes of illustration, and is not intended to be limiting. Embodiments of the present invention may be implemented in further types of computer systems, as would be known to persons skilled in the relevant art(s).

As shown in FIG. 10, computer 1000 includes one or more processors 1002, a system memory 1004, and a bus 1006 that couples various system components including system memory 1004 to processor 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic (e.g., computer program code or instructions) for implementing development portal 102, management portal 104, service 106, data analytics application 110, development tool 302, application information editor 306, payload definition editor 308, reference data definition editor 310, query definition editor 312, control flow editor 314, dashboard UI assembly receiver 328, package generator 330, deployment tool 502, cloud service generator 508, package instantiator 510, database generator 512, cloud service 514, real-time data analytics application 522, data analytics processing engine 702, application monitor 704, authentication module 706, authorization module 708, event collector 710, reference data service 712, state engine 714, user dashboard 716, flowchart 200, flowchart 400, and/or flowchart 600 (including any step of flowcharts 200, 400, and 600), and/or further embodiments described herein.

A user may enter commands and information into the computer 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor 1002 through a serial port interface 1042 that is coupled to bus 1006, but may be connected by other interfaces, such as a parallel port, game port, or a universal serial bus (USB).

A display component 1044 is also connected to bus 1006 via an interface, such as a video adapter 1046. In addition to the monitor, computer 1000 may include other peripheral output devices (not shown) such as speakers and printers.

Computer 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to generally refer to media such as the hard disk associated with hard disk drive 1014, removable magnetic disk 1018, removable optical disk 1022, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable computer 1000 to implement features of embodiments of the present invention discussed herein. Accordingly, such computer programs represent controllers of the computer 1000.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

Example Embodiments

In one embodiment, a method for configuring a deployable real-time data analytics application comprises: enabling a user to provide a name for the real-time data analytics application; enabling the user to provide at least one payload definition that defines real-time data to be received by the real-time data analytics application; enabling the user to provide at least one reference data definition that defines reference data to be accessed by the real-time data analytics application; enabling the user to provide at least one query definition that defines at least one query configured to operate on the real-time data and the reference data to generate output data for the real-time analytics application; and generating an application definition package that indicates the application name and includes the at least one payload definition, the at least one reference data definition, and the at least one query definition, the application definition package configured to be applied to a service framework to enable an instance of the real-time data analytics application to be deployed and be network-accessible.

In an embodiment, the method further comprises: enabling the user to provide at least one control flow definition for the real-time data analytics application; and wherein said generating an application definition package comprises: generating the application definition package to include the at least one control flow definition.

In an embodiment, the method further comprises: enabling the user to configure security characteristics for the real-time data analytics application; and wherein said generating an application definition package comprises: generating the application definition package to indicate the security characteristics.

In an embodiment, the enabling the user to configure security characteristics for the real-time data analytics application comprises: enabling the user to configure at least one of an authentication type or an authorization policy for the real-time data analytics application.

In an embodiment, the method further comprises: enabling the user to provide at least one dashboard user interface (UI) assembly for a user dashboard for the real-time data analytics application, the user dashboard configured to display the output data according to the at least one user interface assembly; and wherein said generating an application definition package comprises: generating the application definition package to include the at least one dashboard UI assembly.

In an embodiment, the method further comprises: enabling access to a deployment tool with which the user can interact to provide the application name, to provide the at least one payload definition, to provide the at least one reference data definition, to provide the at least one query definition, and to cause the application definition package to be generated.

In another embodiment, a method for deploying a real-time data analytics application comprises: receiving a selection of an application definition package that defines the real-time data analytics application, the application definition package indicating an application name and including at least one payload definition, at least one reference data definition, and at least one query definition; receiving a domain name for the real-time data analytics application; generating a network-based service associated with the domain name; applying the application definition package to an application template to generate a finalized real-time data analytics package; and instantiating the finalized real-time data analytics package in the network-based service to create an instance of the real-time data analytics application.

In an embodiment, the method further comprises: generating a database for storage of output data from the real-time data analytics application.

In an embodiment, the method further comprises: deploying at least one dashboard user interface (UI) assembly included in the application definition package to a network-accessible user dashboard generated for the real-time data analytics application.

In an embodiment, the method further comprises: registering the real-time data analytics application with a central database.

In an embodiment, the method further comprises: providing a user with a first network address of a user dashboard generated for the real-time data analytics application; providing a user with a second network address at which real-time data is to be sent to be received by the real-time data analytics application; and providing a user with a third network address for a monitoring console for the real-time data analytics application.

In an embodiment, the method further comprises: enabling a user to start the instance of the real-time data analytics application, to stop the instance of the real-time data analytics application, or to remove the instance of the real-time data analytics application.

In another embodiment, a real-time data analytics service comprises: a data analytics application framework that is configurable to generate a real-time data analytics application, the data analytics application framework including an event collection module, a reference data service, and a data analytics processing engine; and a network-based service that executes in at least one server, the network-based service configured to provide network access for the real-time data analytics application; the event collection module configured to receive at least one payload definition that defines real-time data to be received by the event collection module; the reference data service configured to receive at least one reference data definition that defines reference data to be provided by the reference data service; and the data analytics processing engine configured to receive at least a query definition that defines at least one query, the data analytics processing engine configured to process the real-time data and the reference data according to the at least one query to generate output data for the real-time analytics application.

In an embodiment, the configurable data analytics application framework further comprises: a state engine configured to receive at least one control flow definition.

In an embodiment, the real-time data analytics service further comprises: a user dashboard that is network accessible by a computing device to display the output data to a user of the computing device.

In an embodiment, during operation, the event collector receives real-time data formatted according to the at least one payload definition, the data analytics engine executes the at least one query to generate output data based on the received real-time data and reference data received from the reference data service, and the user dashboard receives the output data for display.

In an embodiment, during operation, the state engine synchronizes the output data according to the at least one control flow definition.

In an embodiment, the configurable data analytics application framework further comprises: an authentication module that is configurable according to a received authentication type to perform an authentication service for the real-time data analytics application.

In an embodiment, the configurable data analytics application framework further comprises: an authorization module that is configurable according to a received authorization policy to perform an authorization service for the real-time data analytics application.

In an embodiment, the real-time data analytics service further comprises: an application monitor configured to monitor a health of the real-time data analytics application.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for configuring a deployable real-time data analytics application, comprising:
    enabling a user to provide a name for the real-time data analytics application;
    enabling the user to provide at least one payload definition that defines real-time data to be received by the real-time data analytics application;
    enabling the user to provide at least one reference data definition that defines reference data to be accessed by the real-time data analytics application;
    enabling the user to provide at least one query definition that defines at least one query configured to operate on the real-time data and the reference data to generate output data for the real-time analytics application;
    enabling the user to configure security characteristics for the real-time data analytics application; and
    generating an application definition package that indicates the application name and includes the at least one payload definition, the at least one reference data definition, the at least one query definition, and the security characteristics, the application definition package configured to be applied to a service framework to enable an instance of the real-time data analytics application to be deployed and be network-accessible.

2. The method of claim 1, further comprising:
    enabling the user to provide at least one control flow definition for the real-time data analytics application; and
    wherein said generating an application definition package comprises:
        generating the application definition package to include the at least one control flow definition.

3. The method of claim 1, wherein said enabling the user to configure security characteristics for the real-time data analytics application comprises:
    enabling the user to configure at least one of an authentication type or an authorization policy for the real-time data analytics application.

4. The method of claim 1, further comprising:
    enabling the user to provide at least one dashboard user interface (UI) assembly for a user dashboard for the real-time data analytics application, the user dashboard configured to display the output data according to the at least one user interface assembly; and
    wherein said generating an application definition package comprises:
        generating the application definition package to include the at least one dashboard UI assembly.

5. The method of claim 1, further comprising:
    enabling access to a development tool configured to accept user interaction to provide the application name, to provide the at least one payload definition, to provide the at least one reference data definition, to provide the at least one query definition, and to cause the application definition package to be generated.

6. A computer-readable program storage device comprising development tool program logic that, when executed by at least one processor in at least one computing device, perform a method for configuring a deployable real-time data analytics application, the development tool program logic comprising instructions for:
    a first editor configured to enable a user to provide a name for the real-time data analytics application and to enable the user to configure security characteristics for the real-time data analytics application;
    a second editor configured to enable the user to provide at least one payload definition that defines real-time data to be received by the real-time data analytics application;
    a third editor configured to enable the user to provide at least one reference data definition that defines reference data to be accessed by the real-time data analytics application;

a fourth editor configured to enable the user to provide at least one query definition that defines at least one query configured to operate on the real-time data and the reference data to generate output data for the real-time analytics application; and a package generator configured to generate an application definition package that indicates the application name and includes the security characteristics, the at least one payload definition, the at least one reference data definition, and the at least one query definition, the application definition package configured to be applied to a service framework to enable an instance of the real-time data analytics application to be deployed and be network-accessible.

7. The computer-readable program storage device comprising development tool program logic of claim 6, the development tool program logic further comprising instructions for:

a fifth editor configured to enable the user to provide at least one control flow definition for the real-time data analytics application; and the package generator is configured to generate the application definition package to include the at least one control flow definition.

8. The computer-readable program storage device comprising development tool program logic of claim 6, wherein the first editor is further configured to enable the user to configure at least one of an authentication type or an authorization policy for the real-time data analytics application.

9. The computer-readable program storage device comprising development tool program logic of claim 6, the development tool program logic further comprising instructions for:

a dashboard user interface (UI) assembly receiver configured to enable the user to provide at least one dashboard UI assembly for a user dashboard for the real-time data analytics application, the user dashboard configured to display the output data according to the at least one user interface assembly; and the package generator is configured to generate the application definition package to include the at least one dashboard UI assembly.

10. The computer-readable program storage device comprising development tool program logic of claim 9, wherein the dashboard UI assembly receiver enables the user to provide an application icon used to identify the real-time data analytics application in a list of applications.

11. The computer-readable program storage device comprising development tool program logic of claim 6, the development tool program logic further comprising instructions for:

a user interface, to be displayed in a display, that contains at least one graphical user interface (GUI) control that enables the user to provide the application name, the at least one payload definition, the at least one reference data definition, and the at least one query definition.

12. A computing device, comprising:
at least one processor circuit; and
at least one memory that stores program code configured to be executed by the at least one processor circuit, the program code comprising:
a first editor configured to enable a user to provide a name for a real-time data analytics application and to enable the user to configure security characteristics for the real-time data analytics application;

a second editor configured to enable the user to provide at least one payload definition that defines real-time data to be received by the real-time data analytics application;

a third editor configured to enable the user to provide at least one reference data definition that defines reference data to be accessed by the real-time data analytics application;

a fourth editor configured to enable the user to provide at least one query definition that defines at least one query configured to operate on the real-time data and the reference data to generate output data for the real-time analytics application; and a package generator configured to generate an application definition package that indicates the application name and includes the security characteristics, the at least one payload definition, the at least one reference data definition, and the at least one query definition, the application definition package configured to be applied to a service framework to enable an instance of the real-time data analytics application to be deployed and be network-accessible.

13. The computing device of claim 12, the program code further comprising:

a fifth editor configured to enable the user to provide at least one control flow definition for the real-time data analytics application; and the package generator is configured to generate the application definition package to include the at least one control flow definition.

14. The computing device of claim 12, wherein the first editor is further configured to enable the user to configure at least one of an authentication type or an authorization policy for the real-time data analytics application.

15. The computing device of claim 12, the program code further comprising:

a dashboard user interface (UI) assembly receiver configured to enable the user to provide at least one dashboard UI assembly for a user dashboard for the real-time data analytics application, the user dashboard configured to display the output data according to the at least one user interface assembly; and the package generator is configured to generate the application definition package to include the at least one dashboard UI assembly.

16. The computing device of claim 15, wherein the dashboard UI assembly receiver enables the user to provide an application icon used to identify the real-time data analytics application in a list of applications.

17. The computing device of claim 12, further comprising:

a user interface displayed in a display that contains at least one graphical user interface (GUI) control that enables the user to provide the application name, the at least one payload definition, the at least one reference data definition, and the at least one query definition.

* * * * *